US006554251B2

(12) United States Patent
Takeda et al.

(10) Patent No.: US 6,554,251 B2
(45) Date of Patent: Apr. 29, 2003

(54) DIAPHRAGM-TYPE VALVE

(75) Inventors: Masaru Takeda, Amagasaki (JP); Koji Miyazaki, Amagasaki (JP); Kazuyuki Miyata, Amagasaki (JP)

(73) Assignee: Kabushiki Kaisha Neriki, Hyogo (JP)

( * ) Notice: Subject to any disclaimer, the term of this patent is extended or adjusted under 35 U.S.C. 154(b) by 31 days.

(21) Appl. No.: 09/808,981

(22) Filed: Mar. 16, 2001

(65) Prior Publication Data
US 2001/0022353 A1 Sep. 20, 2001

(30) Foreign Application Priority Data
Mar. 17, 2000 (JP) ........................ 2000-075043

(51) Int. Cl.⁷ ............................ F16K 41/12; F16K 31/50
(52) U.S. Cl. .................................... 251/335.2; 251/276
(58) Field of Search ............................. 251/278, 335.2, 251/331, 276

(56) References Cited

U.S. PATENT DOCUMENTS 3,698,688 A * 10/1972 Kutz ........................ 251/335.2
4,343,456 A * 8/1982 Zitzloff ........................ 251/255
4,898,210 A 2/1990 Nitta
4,928,919 A 5/1990 Daicho et al.
5,937,895 A * 8/1999 Le Febre et al. ........... 137/494

FOREIGN PATENT DOCUMENTS
JP 62-270872 11/1987

* cited by examiner

*Primary Examiner*—Kevin Lee
(74) *Attorney, Agent, or Firm*—Bacon & Thomas, PLLC

(57) ABSTRACT

A housing (4) is provided with a shut off valve attaching bore (16) within which an intermediate transmission means accommodating space (25) and a shut off valve chamber (9) are formed. A thrust screw member (17), an intermediate transmission means (18) and a closure member (19) are attached into this bore in the mentioned order. A diaphragm (21) is arranged between the closure member (19) and the intermediate transmission means (18). The diaphragm (21) partitions the shut off valve attaching bore (16) into the intermediate transmission means accommodating space (25) and the shut off valve chamber (9), and hermetically seals the shut off valve chamber (9). Disposed in the intermediate transmission means accommodating space (25) is a valve opening spring (29), which resiliently urges the intermediate transmission means (18) in a valve-opening direction.

9 Claims, 2 Drawing Sheets

DIAPHRAGM-TYPE VALVE

BACKGROUND OF THE INVENTION

1. Field of the Invention

The present invention relates to a diaphragm-type valve which is connected to a gas storing cylinder, a piping or the like for gas of ultra-high purity to be used during the production step of semi-conductors or the like.

2. Explanation of Related Art

The gas of ultra-high purity to be used during the production step of semi-conductors needs such a high purity as not allowing the contamination of a little impurity and besides has a corrosive action and a flammability. As such, it has so particular a characteristic that it requires a minute attention when being handled.

There is a conventional example of the diaphragm-type valve used for the gas which is employed when producing semi-conductors or the like, disclosed in Japanese Patent Public Disclosure No. 62-270872.

The conventional diaphragm-type valve comprises a housing within which an inlet bore communicates with an outlet bore via an inlet passage, a shut off valve chamber and an outlet passage in the mentioned order. The inlet passage opens to the shut off valve chamber and has a shut off valve seat formed on a periphery of its open end. The housing is provided with a shut off valve attaching bore, within which the shut off valve chamber is formed. A thrust screw member, an intermediate transmission means and a closure member are attached into the shut off valve attaching bore in the mentioned order from an exterior. The shut off valve chamber accommodates the closure member. A diaphragm is arranged between the closure member and the intermediate transmission means. The diaphragm hermetically seals the shut off valve chamber. Further, the shut off valve chamber accommodates a valve opening spring, which resiliently pushes the closure member in a direction away from the shut off valve seat, namely in a valve-opening direction.

The conventional technique accommodates the valve opening spring within the shut off valve chamber. Therefore, the valve opening spring contacts with fluid which flows through the shut off valve chamber. Besides, the shut off valve chamber cannot be downsized because it has to secure a space for accommodating the valve opening spring, which results in contacting with the fluid in a large area. This entails a problem of being unable to easily reduce the contamination into the fluid of impurities generating from contact surfaces between the fluid and either of the shut off valve chamber and the valve opening spring.

Moreover, if the valve is used to result in wearing off and deteriorating the closure member and the other members, it has to be exchanged. On the other hand, a housing of a valve is generally formed from stainless material or the like which has an excellent anti-corrosiveness. Accordingly, it is expensive and in many cases wears off and deteriorates more seldom than the other parts. Then, when exchanging the valve, it is desired to reuse the expensive housing. However, the closure member, the diaphragm and the intermediate transmission means are made of separate members, respectively and therefore have to be removed from the housing independently. Further, when incorporating new parts, they must be assembled one by one to result in making the exchanging work of parts troublesome.

SUMMARY OF THE INVENTION

The present invention has an object to reduce contact area with fluid which flows through an interior area of the valve and to facilitate the exchanging work of the closure member and the like parts.

In order to accomplish the above-mentioned object, the present invention has constructed a diaphragm-type valve in the following manner, for example, as seen from FIGS. 1 and 2 showing an embodiment of the present invention.

The present invention comprises a housing 4 within which there are provided an inlet bore 6, an inlet passage 8, an outlet passage 10, an outlet bore 11 and a shut off valve attaching bore 16. The shut off valve attaching bore 16 has an intermediate transmission means accommodating space 25, a shut off valve chamber 9 and a shut off valve seat 20 formed in the mentioned order from an exterior of the housing 4 to an interior thereof. A thrust screw member 17, an intermediate transmission means 18 and a closure member 19 are attached into the attaching bore 16 in the mentioned order from the exterior. The shut off valve chamber 9 communicates with the inlet bore 6 through the shut off valve seat 20 and the inlet passage 8 as well as with the outlet bore 11 through the outlet passage 10. The shut off valve chamber 9 accommodates at least part of the closure member 19. Arranged between the intermediate transmission means 18 and the closure member 19 is a diaphragm 21, which partitions the shut off valve attaching bore 16 into the intermediate transmission means accommodating space 25 and the shut off valve chamber 9, and hermetically seals the shut off valve chamber 9. Disposed in the accommodating space 25 is a valve opening spring 29, which resiliently urges the intermediate transmission means 18 in a direction away from the shut off valve seat 20.

The present invention functions as follows.

When a handle or the like rotating portion connected to the thrust screw member rotates the thrust screw member in a tightening direction, the thrust screw member spirally advances to produce a thrust. The intermediate transmission means which has received the thrust pushes the closure member through the diaphragm against a resilient pushing force of the valve opening spring. As a result, the closure member moves toward the shut off valve seat and comes into contact with the shut off valve seat to close the valve.

On the other hand, when the rotating portion is rotated in a loosening direction, the thrust screw member retreats to remove the thrust added to the intermediate transmission means. As a result, the intermediate transmission means is resiliently pushed in a direction away from the shut off valve seat by the resilient pushing force of the valve opening spring and the closure member fixed to the intermediate transmission means separates from the shut off valve seat to open the valve.

If the valve is used to result in wearing off the closure member and the other members or the like, it has to be exchanged. In the case where the housing is reused when making this exchange, a cap bolt and the like which fixes the thrust screw member is removed to take the respective parts out of the shut off valve attaching bore. At this time, the intermediate transmission means, the diaphragm and the closure member are mutually fixed. Therefore, they are easily handled as one unit. As for the housing from which the respective parts are removed, confirmation is made to see the housing does not suffer from a large wear or the like. And after having removed a likelihood of generating impurities, by washing and the like according to the need, new parts are incorporated into the shut off valve attaching bore. Also at this time, new closure member, diaphragm and intermediate transmission means are assembled into one set of unit. Accordingly, the respective parts are easily incorporated into the shut off valve attaching bore.

The present invention is constructed and functions as mentioned above and therefore produces the following advantages.

(1) The valve opening spring is arranged in the intermediate transmission means accommodating space and the shut off valve chamber accommodates only the closure member. This removes a probability that fluid which flows through the interior area of the shut off valve chamber contacts with the valve opening spring. Besides, there is no necessity of providing a space which accommodates the valve opening spring within the shut off valve chamber. Therefore, the shut off valve chamber can be formed into a small space, which results in the possibility of reducing a contact area with the fluid which flows through its interior area. This can decrease the contamination of impurities which generate from the valve, into gas of ultra-high purity.

(2) Since the closure member and the intermediate transmission means are fixed to one another through the diaphragm, they can be handled as one set of unit. As a result, in the case where the closure member and the like wear off or deteriorate, it is possible to easily effect the exchanging work such as removal and assembling of these parts.

It is sufficient if the intermediate transmission means and the closure member are fixed to each other through a diaphragm while the diaphragm is maintaining to hermetically seal the interior area of the shut off valve chamber. The fixing structure is not limited to a specific one.

For instance, the present invention includes the following diaphragm-type valve.

One (the closure member 19) of the intermediate transmission means 18 and the closure member 19 is provided with a projection 19b, to which the other 18 is fixed. And the diaphragm 21 is provided with an insertion hole 26 into which the projection 19b is inserted and with an inner peripheral wall portion of a peripheral edge of the insertion hole 26. The inner peripheral wall portion of the diaphragm 21 is hermetically fixed to at least one of the intermediate transmission means 18 and the closure member 19. It can be hermetically fixed by welding.

It is preferable to form the projection on the side of the closure member and project it toward the intermediate transmission means accommodating space rather than toward the diaphragm. In this case, the shut off valve chamber can have its interior area downsized to result in reducing the contact area with the fluid much more.

The present invention also includes the following diaphragm-type valve.

The thrust screw member 17 has an inner end provided between itself and the intermediate transmission means 18. The inner end is formed with a curved surface which projects inwards. In this case, a rotational force is hardly transmitted to the intermediate transmission means, but only the thrust is satisfactorily transmitted thereto when spirally advancing the thrust screw member.

In addition, a sheet is interposed between the thrust screw member and the intermediate transmission means. Also in this case, the rotational force is hardly transmitted to the intermediate transmission means, but only the thrust is satisfactorily transmitted thereto when spirally advancing the thrust screw member. In this case, if the inner end of the thrust screw member 17 is formed with a curved surface, the rotational force is more hardly transmitted to the intermediate transmission means and therefore it is more preferable.

The valve opening spring is sufficient if it is arranged in the intermediate transmission means accommodating space and resiliently urges the intermediate transmission means in a valve-opening direction. It need not be attached by a specific and limitative structure.

For example, the present invention includes the following diaphragm-type valve.

The diaphragm 21 is formed with an outer peripheral portion. A cylindrical push sleeve 22 is arranged around the intermediate transmission means 18 and pushes the outer peripheral portion of the diaphragm 21 to hermetically seal the shut off valve chamber 9. The push sleeve 22 is provided with a spring retainer 27 and the intermediate transmission means 18 is formed with a spring presser 28. The valve opening spring 29 is attached between the spring retainer 27 and the spring presser 28. If constructed like this, the valve opening spring and the push sleeve can be assembled with the intermediate transmission means, the diaphragm and the closure member into one unit.

More specifically, the push sleeve arranged around the intermediate transmission means pushes the outer peripheral portion of the diaphragm and therefore is not removed from the diaphragm side. On the other hand, the valve opening spring is attached between the spring retainer in an inner surface of the push sleeve and the spring presser in an outer surface of the intermediate transmission means. The valve opening spring resiliently pushes the intermediate transmission means in the valve-opening direction. Thus the push sleeve arranged in the intermediate transmission means accommodating space is resiliently pushed in a valve-closing direction, namely toward the diaphragm by a reaction force of the valve opening spring. As a result, while the intermediate transmission means and the diaphragm are mutually fixed into an integral structure, the push sleeve cannot be removed therefrom as well as the valve opening spring. Accordingly, as for the valve having this structure, it is possible to more readily effect the exchanging work of parts because the valve opening spring and the push sleeve can be assembled with the intermediate transmission means, the diaphragm and the closure member into one unit.

It is more preferable to form a linear guide in the shape of a vertical groove between the intermediate transmission means and the push sleeve. This can assuredly prevent the rotation of the intermediate transmission means, thereby transmitting only the thrust of the intermediate transmission means to the diaphragm. This results in the possibility of inhibiting a torsion force from being added to the diaphragm and lengthening the lifetime of the diaphragm.

DESCRIPTION OF THE PREFERRED EMBODIMENTS

Hereafter, explanation is given for an embodiment of the present invention based on the drawings.

Figure 1:
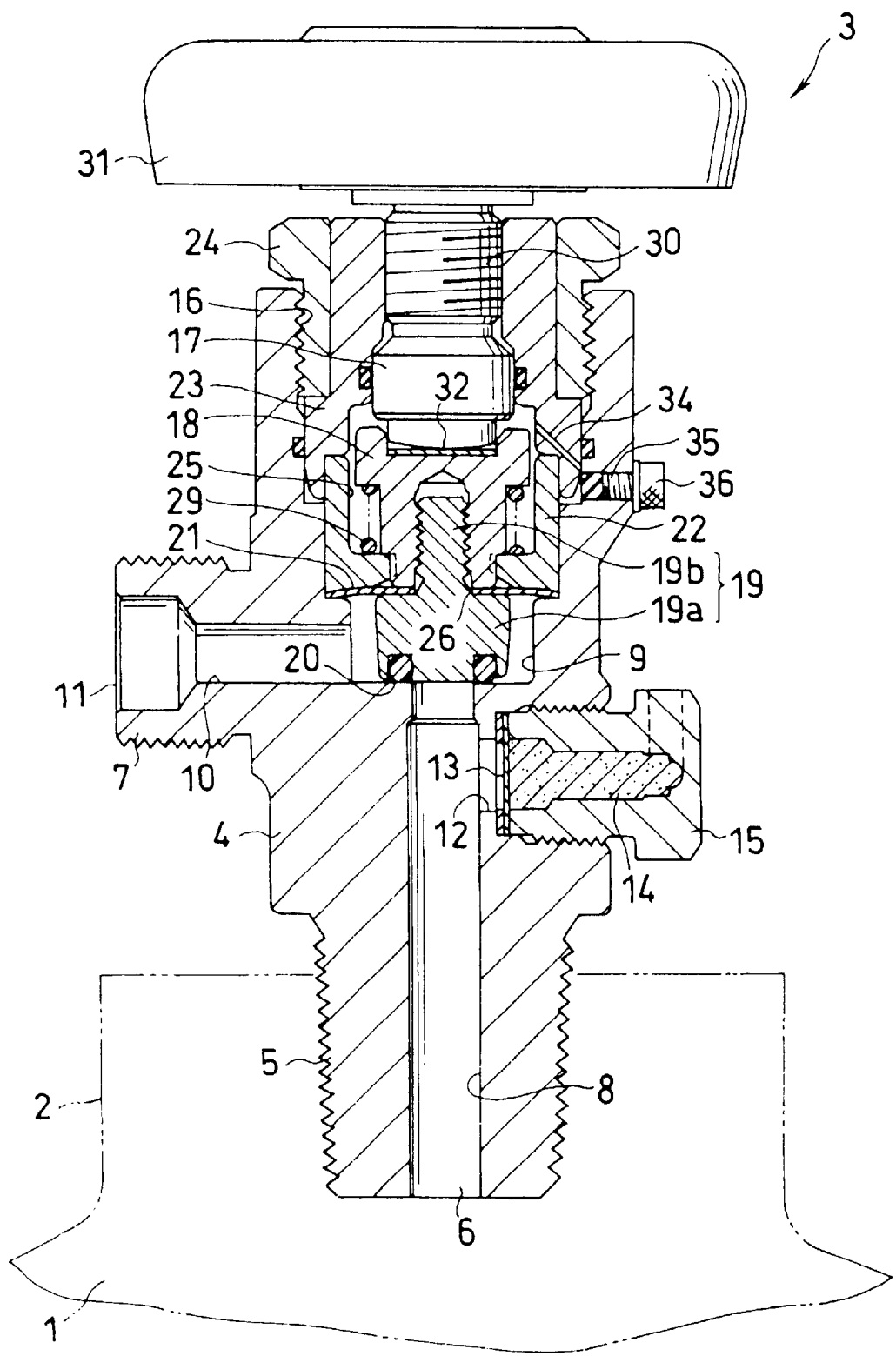
FIG. 1 shows an embodiment of the present invention and is a vertical sectional view of a diaphragm-type cylinder valve.

As shown in FIG. 1, a gas cylinder 1 has a neck portion 2 to which a housing 4 of a diaphragm-type cylinder valve 3 is fixed in screw-thread fitting relationship. The housing 4 is made vertically long. Its threaded leg portion 5 has an under surface formed with an inlet bore 6. The housing 4 has a mid height portion from which an outlet nozzle 7 projects horizontally. A gas take-out mouthpiece (not shown) is connectable to the outlet nozzle 7.

The inlet bore 6 communicates with an outlet bore 11 formed in an end surface of the outlet nozzle 7 through a vertical inlet passage 8, a shut off valve chamber 9 provided at the mid height portion of the housing 4 and a horizontal outlet passage 10 provided laterally of the shut off valve chamber 9 in the mentioned order.

A gas discharge passage 12 branches from a halfway portion of the inlet passage 8 and communicates with a safety valve 15 having a rupture disk 13 and a fusible plug 14. The type of the safety valve is not limited to that utilized in this embodiment and other types may be adopted.

The diaphragm-type valve of the present invention is applicable to a valve provided at a halfway of a piping, although in this embodiment, explanation is given for a case where it is applied to a cylinder valve.

The housing 4 has an upper surface formed with a downward shut off valve attaching bore 16. This bore 16 has an intermediate transmission means accommodating space 25, the shut off valve chamber 9 and a shut off valve seat 20 formed in the mentioned order from an exterior. A spindle 17 of a thrust screw member, an intermediate transmission means 18 and a closure member 19 are attached into the bore 16 in the mentioned order from the exterior. The closure member 19 comprises a main body portion 19a, which is accommodated in the shut off valve chamber 9 and is opposed to the shut off valve seat 20.

A metal diaphragm 21 is arranged between the closure member 19 and the intermediate transmission means 18. This diaphragm 21 has an outer peripheral portion pushed to a peripheral wall of the shut off valve chamber 9 by a cap bolt 24 through a cylindrical push sleeve 22 and a presser cylinder 23. This partitions the shut off valve attaching bore 16 into the intermediate transmission means accommodating space 25 and the shut off valve chamber 9, and hermetically seals the shut off valve chamber 9. In this embodiment, the cap bolt 24 is formed separate from the presser cylinder 23. But according to the present invention, both may be formed integrally with each other so as to reduce the number of parts. In this case, if the presser cylinder 23 which also serves as the cap bolt 24 is attached into the shut off valve attaching bore 16 in screw-thread engagement, it pushes the outer peripheral portion of the diaphragm 21 to the peripheral wall of the shut off valve chamber 9 through the push sleeve 22.

Figure 2:
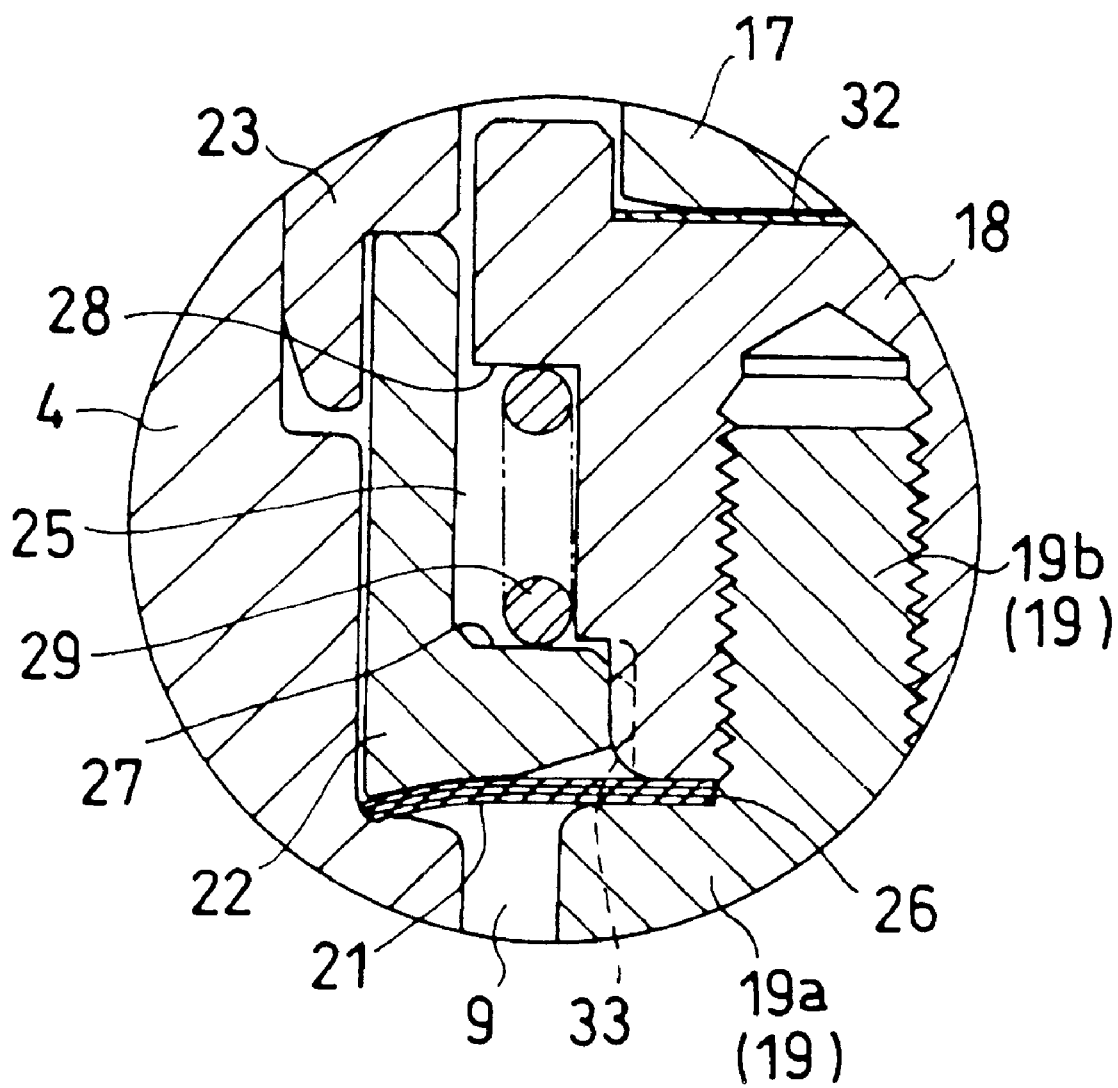
FIG. 2 is a sectional view showing an enlarged essential portion in the vicinity of an intermediate transmission means.

As shown in FIG. 2, the diaphragm 21 is formed from a plurality of metal sheets and is provided at its mid portion with an insertion hole 26. Inserted into this insertion hole 26 is a projection 19b provided at a mid portion of an upper surface of the main body portion 19a of the closure member 19. At this time, the insertion hole 26 of the diaphragm 21 has an inner peripheral wall portion of its peripheral edge welded to the closure member 19 and hermetically fixed thereto in order that the diaphragm 21 can hermetically seal an interior area of the shut off valve chamber 9.

The projection 19b of the closure member 19 sticks out from the insertion hole 26 into the intermediate transmission means accommodating space 25. It engages with the intermediate transmission means 18 in screw-thread fitting relationship and is firmly fixed thereto with an adhesive or the like so as not to loosen. At this time, the diaphragm 21 is reliably held by the intermediate transmission means 18 and the closure member 19. This may be adapted so as to be able to hermetically seal the surroundings of the insertion hole 26 with assuredness.

The push sleeve 22 is arranged around the intermediate transmission means 18 and its under surface reliably pushes the outer peripheral portion of the diaphragm 21 to a peripheral wall of the shut off valve chamber 9. The cylindrical push sleeve 22 has a lower and inner surface formed with a spring retainer 27. The intermediate transmission means 18 has an upper and outer surface formed with a spring presser 28. A valve opening spring 29 is attached between the spring retainer 27 and the spring presser 28. This valve opening spring 29 upwardly and resiliently urges the intermediate transmission means 18.

As shown in FIG. 1, the presser cylinder 23 has an upper and inner surface formed with inwardly threaded portions. The spindle 17 has externally threaded portions 30 which engage with the inwardly threaded portions so that it is rotatably supported. The spindle 17 has an upper end to which a handle 31 of a rotating portion is fixed. This handle 31 is rotated for fastening to thereby downwardly and spirally advance the spindle 17. A leading end of the spindle 17 pushes the intermediate transmission means 18 downwards.

Here, the closure member 19, the intermediate transmission means 18 and the diaphragm 21 are mutually fixed and the diaphragm 21 is fixed to the peripheral wall of the shut off valve chamber 9 of the housing 4. This requires to move the intermediate transmission means 18 only vertically. Therefore, for example, the spindle 17 has a lower end downwardly projected to provide a curved surface in order that merely a downward thrust can be transmitted to the intermediate transmission means 18 but a rotational force can be hardly transmitted thereto.

In this embodiment, a sheet 32 is interposed between the lower end of the spindle 17 and the intermediate transmission means 18 so that only a downward thrust produced by a spiral advancement of the spindle 17 is transmitted more satisfactorily to the intermediate transmission means 18. Further, as shown in FIG. 2, provided between the intermediate transmission means 18 and the push sleeve 22 is a linear guide 33 in the shape of a vertical groove. However, the structure of this linear guide 33 is not limited to that of this embodiment. In the event that the rotational force of the spindle 17 which is transmitted to the intermediate transmission means 18 is sufficiently small, this linear guide 33 and the sheet 32 may be omitted.

The presser cylinder 23 is formed with a gas guide hole 34 which extends from an inner side of the presser cylinder 23 to an outer side thereof. The gas guide hole 34 makes it possible to confirm that gas within the shut off valve chamber 9 does not leak out to a port 35 for checking gas leakage, through the intermediate transmission means accommodating space 25 after having assembled the valve or at the time of doing maintenance. After having made this confirmation, the port 35 is hermetically sealed by a hexagon socket head cap screw 36.

Next, explanation is given for the way how to open and close the diaphragm-type cylinder valve 3.

The handle 31 is rotated in a fastening direction and then the spindle 17 spirally advances. A resulting thrust is received by the intermediate transmission means 18, which descends against a resilient pushing force of the valve opening spring 29. As a result, through the diaphragm 21, the closure member 19 also descends and moves toward the shut off valve seat 20 to come into contact therewith, thereby closing the valve.

On the other hand, when the handle 31 is rotated in a loosening direction, the spindle 17 retreats. This gets rid of the thrust added to the intermediate transmission means 18. As a result, the intermediate transmission means 18 is resiliently pushed by the resilient pushing force of the valve opening spring 29 upwards, namely in a valve-opening direction. The closure member 19 connected to the intermediate transmission means 18 also ascends and separates from the shut off valve seat 20 to thereby open the valve.

If the valve is used to result in wearing off the closure member 19 and the other parts or the like, it must be exchanged. At this time, in the case, where the housing 4 made of stainless or the like expensive material is reused, the cap bolt 24 is removed after having dismounted the handle 31, if required. This takes the spindle 17 and the presser cylinder 23 supporting the spindle 17 out of the shut off valve attaching bore 16. Then the intermediate transmission means 18, the diaphragm 21, the closure member 19, the push sleeve 22 and the valve opening spring 29 are taken out of the bore 16 as one unit.

The housing 4 is checked and is rid of a likelihood that impurities generate, by washing and the like according to the need. Thereafter, new parts are incorporated into the shut off valve attaching bore 16. In this case, new intermediate transmission means 18, diaphragm 21 and closure member 19 are mutually fixed, and new push sleeve 22 and valve opening spring 29 are assembled with them into one unit. This unit is attached into the bore 16. Subsequently, the presser cylinder 23 and the spindle 17 are attached into the bore 16, and the diaphragm 21 is firmly pushed by the cap bolt 24 through the presser cylinder 23 and the push sleeve 22. The handle 31 is attached to the spindle 17. If these presser cylinder 23 and the like wear off as well, worn ones are exchanged for new ones. And after having confirmed by the gas-leakage checking port 35 that there occurs no gas leakage from the shut off valve chamber 9 to the intermediate transmission means accommodating space 25, the port 35 is sealed to finish the assembling of the cylinder valve 3.

What is claimed is:

1. A diaphragm valve comprising:

a housing (4) having an inlet bore (6), an inlet passage (8), an outlet passage (10), an outlet bore (11) and a shut off valve attaching bore (16);

the shut off valve attaching bore (16) including an intermediate transmission means accommodating space (25), a shut off valve chamber (9) and a shut off valve seat (20) in the mentioned order from an exterior of the housing (4) to an interior thereof and having an interior area into which a thrust screw member (17) having externally threaded portions (30), an intermediate transmission means (18) and a closure member (19) are in communication with each other in the mentioned order from the exterior;

the shut off valve chamber (9) communicating with the inlet bore (6) through the shut off valve seat (20) and the inlet passage (8) as well as with the outlet bore (11) through the outlet passage(10);

at least part of the closure member (19) accommodated in the shut off valve chamber (9);

a diaphragm (21) having an outer peripheral portion and arranged between the intermediate transmission means (18) and the closure member (19), the diaphragm (21) partitioning the shut off valve attaching bore (16) into the intermediate transmission means accommodating space (25) and the shut off valve chamber (9), and hermetically sealing the shut off chamber (9);

a valve opening spring (29) disposed in the intermediate transmission means accommodating space (25) and resiliently urging the intermediate transmission means (18) in a direction away from the shut off valve seat (20);

a cylindrical push sleeve (22) arranged around the intermediate transmission means (18) and configured to push the outer peripheral portion of the diaphragm (21) to hermetically seal the shut valve chamber (9); and a presser cylinder (23) connected to the housing and engaging the externally threaded portions (30) of the thrust screw member (17) in a screw-thread relationship, the presser cylinder (23) being axially and linearly moveable in relation to the push sleeve (22), and configured to push the push sleeve (22) towards the diaphragm (21).

2. The diaphragm valve as set forth in claim 1, wherein one (19) of the intermediate transmission means (18) and the closure member (19) is formed with a projection (19b), to which the other (18) is fixed, and the diaphragm (21) includes an insertion hole (26) into which the projection (19b) is inserted and an inner peripheral wall portion of a peripheral edge of the insertion hole (26), the inner peripheral wall portion being hermetically fixed to at least one of the intermediate transmission means (18) and the closure member (19).

3. The diaphragm valve as set forth in claim 2, wherein the projection (19b) is formed on the closure member (19).

4. The diaphragm valve as set forth in claim 2, wherein the diaphragm (21) includes the inner peripheral wall portion hermetically fixed to at least one of the intermediate transmission means (18) and the closure member (19) by welding.

5. The diaphragm valve as set forth in claim 1, wherein the thrust screw member (17) has between itself and the intermediate transmission means (18) an inner end, which is provided with a curved surface projecting inwards.

6. The diaphragm valve as set forth in claim 1 further including a sheet (32) interposed between the thrust screw member (17) and the intermediate transmission means (18).

7. The diaphragm valve as set forth in claim 1 further comprising:

a spring retainer (27) formed in the push sleeve (22);

a spring presser (28) formed in the intermediate transmission means (28); and the valve opening spring (29) attached between the spring retainer (27) and the spring presser (28).

8. The diaphragm valve as set forth in claim 7 further including a liner guide (33) in the shape of a vertical groove formed between the intermediate transmission means (18) and the push sleeve (22).

9. The diaphragm valve as set forth in claim 1 further including the push sleeve (22) having a back-up surface which backs up at least part of a radially inner side portion of the outer peripheral portion of the diaphragm (21) when the closure member (19) has been opened.

* * * * *